(12) United States Patent
Kamble et al.

(10) Patent No.: US 11,184,270 B2
(45) Date of Patent: Nov. 23, 2021

(54) SWITCH MONITORING STATISTICS GATHERING AT SERVERS AND GATEWAYS FOR OVERLAY NETWORKS

(71) Applicant: International Business Machines Corporation, Armonk, NY (US)

(72) Inventors: Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/559,383

(22) Filed: Sep. 3, 2019

(65) Prior Publication Data

US 2019/0394110 A1 Dec. 26, 2019

Related U.S. Application Data

(63) Continuation of application No. 14/952,599, filed on Nov. 25, 2015, now Pat. No. 10,447,569, which is a continuation of application No. 13/530,031, filed on Jun. 21, 2012, now Pat. No. 9,225,550.

(51) Int. Cl.
*H04L 12/46* (2006.01)
*H04L 12/26* (2006.01)

(52) U.S. Cl.
CPC ...... *H04L 43/0894* (2013.01); *H04L 12/4633* (2013.01); *H04L 12/4645* (2013.01)

(58) Field of Classification Search
CPC ............ H04L 43/0894; H04L 12/4633; H04L 12/4645

USPC ......................................................... 709/224
See application file for complete search history.

(56) References Cited

U.S. PATENT DOCUMENTS

| | | |
|---|---|---|
| 7,062,782 B1 | 6/2006 | Stone et al. |
| 8,175,539 B2 | 5/2012 | Diener et al. |
| 8,194,646 B2 | 6/2012 | Elliott et al. |
| 8,204,082 B2 | 6/2012 | Jungck et al. |

(Continued)

OTHER PUBLICATIONS

Non-Final Office Action from U.S. Appl. No. 13/530,031, dated Oct. 1, 2014.

(Continued)

*Primary Examiner* — Normin Abedin
*Assistant Examiner* — Sibte H Bukhari
(74) *Attorney, Agent, or Firm* — Zilka-Kotab, P.C.

(57) ABSTRACT

In one embodiment, a method includes creating on a per-tunnel basis, by a hardware processor, statistics about overlay-encapsulated packets which are received by or sent by the hardware processor across an overlay network, including counting events associated with de-encapsulation of one or more inner packets from an overlay-encapsulated packet; recording, by the hardware processor, the statistics in association with a virtual network identifier and a tunnel identifier that identifies a tunnel on which the overlay-encapsulated packets are received or sent; and maintaining, by the hardware processor, a table indexed for the virtual network identifier and the tunnel identifier, the table including the virtual network identifier; the tunnel identifier; and statistic bucket identifiers pointing to locations where statistics associated with the virtual network identifier and the tunnel identifier are stored.

20 Claims, 5 Drawing Sheets

(56) References Cited

U.S. PATENT DOCUMENTS

| | | | |
|---|---|---|---|
| 9,225,550 B2 | 12/2015 | Kamble et al. | |
| 10,447,569 B2 | 10/2019 | Kamble et al. | |
| 2003/0110276 A1* | 6/2003 | Riddle | H04L 41/12 709/230 |
| 2006/0280175 A1* | 12/2006 | Kanakasapapathi | H04L 47/10 370/389 |
| 2009/0285103 A1* | 11/2009 | Hirano | H04L 45/00 370/241 |
| 2011/0082910 A1* | 4/2011 | Breslin | H04L 43/12 709/217 |
| 2011/0271007 A1 | 11/2011 | Wang et al. | |
| 2013/0298227 A1* | 11/2013 | Smith | H04L 63/0414 726/22 |
| 2013/0346592 A1 | 12/2013 | Kamble et al. | |
| 2016/0087867 A1 | 3/2016 | Kamble et al. | |

OTHER PUBLICATIONS

Final Office Action from U.S. Appl. No. 13/530,031, dated May 4, 2015.
Notice of Allowance from U.S. Appl. No. 13/530,031, dated Aug. 12, 2015.
Guo et al., "Measurements, analysis and modeling of BitTorrent-like systems," Proceedings of the 5th Conference on Internet Measurement, Oct. 19-21, 2005, pp. 35-48.
Gao et al., "SMON: Self-Managed Overlay Networks for Managing Distributed Applications," IEEE Network Operations and Management Symposium, Apr. 19-23, 2010, pp. 80-87.
Cohen et al., "Survey/Analysis of Levels I, II and III Attack Attribution Techniques," Cs3 Inc., Apr. 27, 2004.
Bhaskaran et al., "A New Promising IP Traceback Approach and its Comparison with Existing Approaches," Information Technology Journal, vol. 6, No. 2, 2007, pp. 182-188.
Kamble et al., U.S. Appl. No. 13/530,031, filed Jun. 21, 2012.
Kamble et al., U.S. Appl. No. 14/952,599, filed Nov. 25, 2015.
Non-Final Office Action from U.S. Appl. No. 14/952,599, dated May 25, 2017.
Final Office Action from U.S. Appl. No. 14/952,599, dated Oct. 19, 2017.
Advisory Action from U.S. Appl. No. 14/952,599, dated Jan. 30, 2018.
Non-Final Office Action from U.S. Appl. No. 14/952,599, dated Jul. 27, 2018.
Final Office Action from U.S. Appl. No. 14/952,599, dated Feb. 5, 2019.
Advisory Action from U.S. Appl. No. 14/952,599, dated May 2, 2019.
Notice of Allowance from U.S. Appl. No. 14/952,599, dated Jun. 3, 2019.

* cited by examiner

SWITCH MONITORING STATISTICS GATHERING AT SERVERS AND GATEWAYS FOR OVERLAY NETWORKS

BACKGROUND

The present invention relates to data center infrastructure, and more particularly, this invention relates to gathering statistics at servers and gateways to understand and manage overlay networks.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

However, current methods of collecting statistics to understand and manage network elements, such as those which conform to the Remote MONitoring (RMON) Management Information Base (MIB) and/or the Switch MONitoring (SMON) MIB are only capable of being implemented at an edge of an overlay network. This is because these methods of collecting statistics do not have the visibility to inner packets inside of overlay-encapsulated packets, and therefore there is a wealth of knowledge about the usage, distribution, and overall performance of network elements within an overlay network that is not able to be collected with conventional methods and approaches.

SUMMARY

In one embodiment, a system includes a hardware processor and logic integrated with the hardware processor, executable by the hardware processor, or integrated with and executable by the hardware processor, where the logic is configured to create, on a per-tunnel basis, statistics about overlay-encapsulated packets which are received by or sent by the hardware processor across an overlay network, including counting events associated with de-encapsulation of one or more inner packets from an overlay-encapsulated packet; record the statistics in association with a virtual network identifier and a tunnel identifier that identifies a tunnel on which the overlay-encapsulated packets are received or sent; and maintain a table indexed for the virtual network identifier and the tunnel identifier, the table including the virtual network identifier; the tunnel identifier; and statistic bucket identifiers pointing to locations where statistics associated with the virtual network identifier and the tunnel identifier are stored.

In another embodiment, a method includes creating on a per-tunnel basis, by a hardware processor, statistics about overlay-encapsulated packets which are received by or sent by the hardware processor across an overlay network, including counting events associated with de-encapsulation of one or more inner packets from an overlay-encapsulated packet; recording, by the hardware processor, the statistics in association with a virtual network identifier and a tunnel identifier that identifies a tunnel on which the overlay-encapsulated packets are received or sent; and maintaining, by the hardware processor, a table indexed for the virtual network identifier and the tunnel identifier, the table including the virtual network identifier; the tunnel identifier; and statistic bucket identifiers pointing to locations where statistics associated with the virtual network identifier and the tunnel identifier are stored.

In yet another embodiment, a computer program product includes a computer readable hardware storage device having computer readable program code embodied therewith, the embodied computer readable program code including computer readable program code to create, on a per-tunnel basis, statistics about overlay-encapsulated packets which are received by or sent by a processor across an overlay network, including counting events associated with de-encapsulation of one or more inner packets from an overlay-encapsulated packet; computer readable program code to record the statistics in association with a virtual network identifier and a tunnel identifier that identifies a tunnel on which the overlay-encapsulated packets are received or sent; and computer readable program code to maintain a table indexed for the virtual network identifier and the tunnel identifier, the table including the virtual network identifier; the tunnel identifier; and statistic bucket identifiers pointing to locations where statistics associated with the virtual network identifier and the tunnel identifier are stored.

Other aspects and embodiments of the present invention will become apparent from the following detailed description, which, when taken in conjunction with the drawings, illustrate by way of example the principles of the invention.

DETAILED DESCRIPTION

Figure 1:
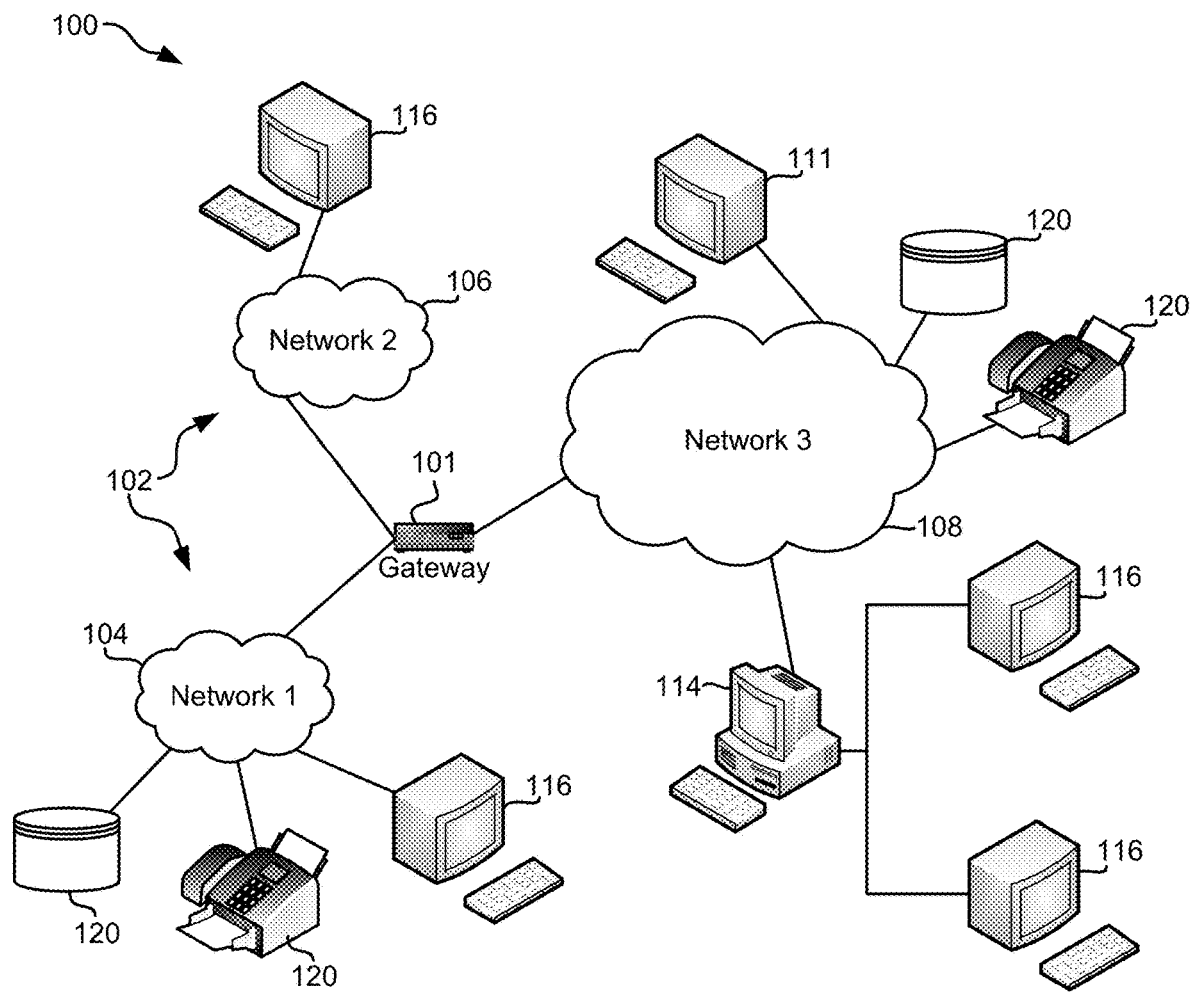
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a plurality of overlay-capable devices, each overlay-capable device having an interface adapted for terminating and/or originating tunnels in an overlay network with other overlay-capable devices, logic adapted for creating statistics about overlay-encapsulated packets which are received by or sent by the overlay-capable device, logic adapted for accumulating the statistics, and logic adapted for storing the statistics in an accessible memory of the overlay-capable device.

In another general embodiment, a method for generating statistics about encapsulated packets within a virtual overlay network includes creating statistics about overlay-encapsulated packets which are received by or sent by each overlay-capable device in an overlay network, accumulating the statistics for each overlay-capable device through which the overlay-encapsulated packets passed, and storing the statistics in an accessible manner.

In yet another general embodiment, a computer program product for generating statistics about encapsulated packets within a virtual overlay network includes a computer readable storage medium having computer readable program code embodied therewith, the computer readable program code including computer readable program code configured for creating statistics about overlay-encapsulated packets which are received by or sent by each overlay-capable device in an overlay network, computer readable program code configured for accumulating the statistics for each overlay-capable device through which the overlay-encapsulated packets passed, and computer readable program code configured for storing the statistics in an accessible manner.

According to another general embodiment, an overlay network gateway includes a switching processor having logic adapted for terminating and/or originating tunnels in an overlay network, logic adapted for creating statistics about overlay-encapsulated packets which are received by or sent by the overlay-capable device, logic adapted for accumulating the statistics, logic adapted for recording the statistics with a virtual network identifier and a tunnel identifier associated with the overlay-encapsulated packets, and logic adapted for storing the statistics in a memory or a set of registers of the overlay network gateway. The logic adapted for creating the statistics includes logic adapted for counting events associated with de-encapsulation of inner packets from overlay-encapsulated packets and logic adapted for counting events associated with encapsulation of inner packets into overlay-encapsulated packets.

In yet another general embodiment, an overlay-capable server includes logic adapted for terminating and/or originating tunnels in an overlay network, logic adapted for creating statistics about overlay-encapsulated packets which are received by or sent by the overlay-capable server, logic adapted for accumulating the statistics, logic adapted for recording the statistics with a virtual network identifier and a tunnel identifier associated with the overlay-encapsulated packets, and logic adapted for storing the statistics in a memory or a set of registers of the overlay-capable server. The logic adapted for creating the statistics includes logic adapted for counting events associated with de-encapsulation of inner packets from overlay-encapsulated packets and logic adapted for counting events associated with encapsulation of inner packets into overlay-encapsulated packets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
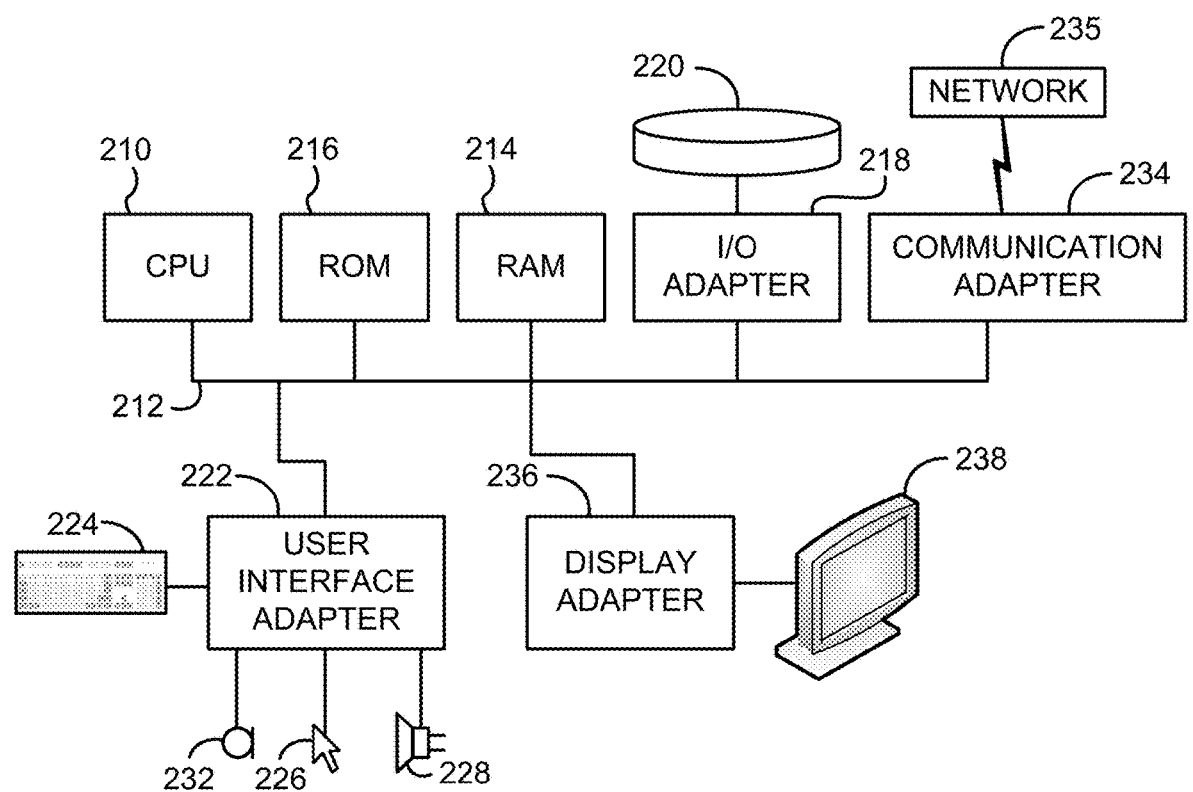
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
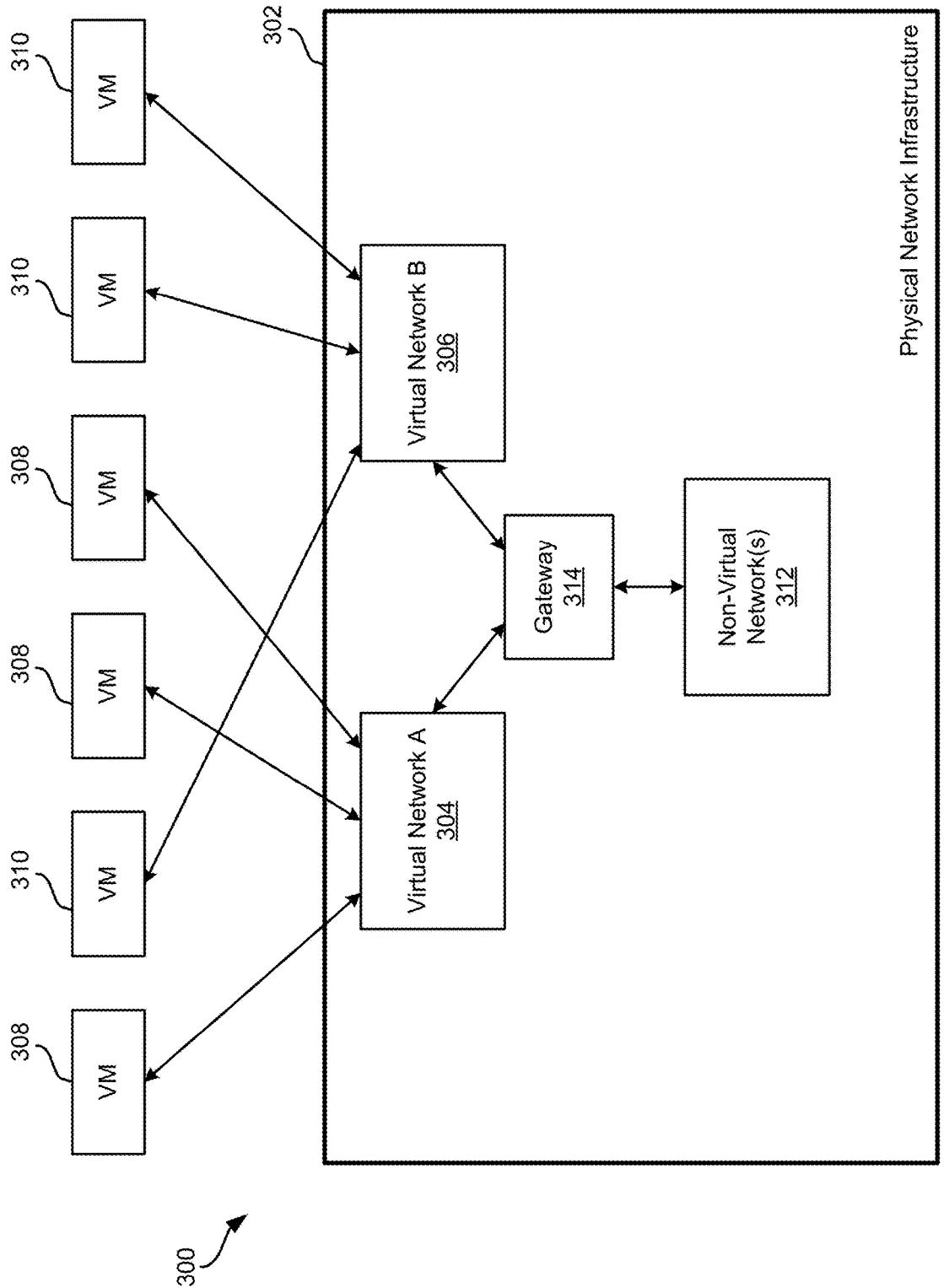
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling L2 packets over the L3 network by encapsulating the L2 packets into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

For the sake of simplicity, statistics, as used herein in multiple embodiments and approaches, may refer to metrics, numbers, variables, counts, trends, and/or any other useful entity which may be accumulated, counted, recorded, analyzed, and/or in any way used to further understand, analyze, and/or manage a network and/or network elements.

Overlay Networks are like VLANs, but packets are encapsulated inside a L2/UDP/ IP/overlay header. Counting statistics at an outermost L2/L3 is currently performed in conventional systems, such as by using the Switch MONitoring (SMON) Management Information Base (MIB). Counting statistics of encapsulated packets, however, is not capable using conventional MIBs and/or systems and methods. No MIBs designed for statistics gathering for packets encapsulated inside overlay headers is currently available. Accordingly, it would be beneficial if overlay gateways and servers could be provided with logic, MIB s, and infrastructure to count packets based on outer and inner headers on a per overlay network (such per VXLAN) and per tunnel basis.

According to one embodiment, statistics may be collected which are similar to, but not limited to, statistics that are collected in switch monitoring, such as SMON, or remote monitoring, such as RMON statistics group.

In one embodiment, some exemplary statistics which may be collected/counted include any of the following, which are monitored per overlay network Tunnel ID. The L2 Ingress Statistics counting based on an outermost LAN header, which may be created when an overlay-encapsulated packet is de-encapsulated, may include:

SmonVXLANIdInStatsEntry ::=SEQUENCE {smonVxlanIdInStatsId Integer32, smonVxlanIdInStatsTotalPkts Counter32, smonVxlanIdInStatsTotalOctets Counter32, smonVxlanIdInStatsNUcastPkts Counter32, smonVxlanIdInStatsNUcastOctets Counter32, smoriVxlanIdInStatsBroadcastPkts Counter32, smonVxlanIdInStatsMulticastPkts Counter32, smonVxlanIdInStatsCRCAlignErrors Counter32, smonVxlanIdInStatsUndersizePkts Counter32, smonVxlanIdInStatsOversizePkts Counter32, smonVxlanIdInStatsFragments Counter32, smonVxlanIdInStatsPkts64Octets Counter32, smonVxlanIdInStatsPkts65to127Octets Counter32, smonVxlanIdInStatsPkts128to255Octets Counter32, smonVxlanIdInStatsPkts256to511Octets Counter32, smonVxlanIdInStatsPkts512to1023Octets Counter32, smonVxlanIdInStatsPkts1024to1518Octets Counter32, smonVxlanIdInStatsPktsHeaderErr Counter32 smonVxlanIdInStatsCreateTime LastCreateTime }.

The tunnel ID to VNID mapping may be performed in global statistics structures, which include a two dimensional table of Tunnel ID versus VNID mapping.

In accordance with another exemplary embodiment, L2 Egress Statistics counting based on an outermost LAN header, i.e., per tunnel basis, which may be created when information is encapsulated into an overlay-encapsulated packet, may include:

SmonVXLANIdOutStatsEntry ::=SEQUENCE {smonVxlanIdOutStatsId Integer32, smonVxlanIdOutStatsTotalPkts Counter32, smonVxlanIdOutStatsTotalOctets Counter32, smonVxlanIdOutStatsNUcastPkts Counter32, smonVxlanIdOutStatsNUcastOctets Counter32, smonV xlanidOutStatsBroadcastPkts Counter32, smonVxlanIdOutStatsMulticastPkts Counter32, smonVxlanIdOutStatsCRCAlignErrors Counter32, smonVxlanIdOutStatsUndersizePkts Counter32, smonVxlanIdOutStatsOversizePkts Counter32, smonVxlanIdOutStatsFragments Counter32, smonVxlanIdOutStatsPkts64Octets Counter32, smonVxlanIdOutStatsPkts65to127Octets Counter32, smonVxlanIdOutStatsPkts128to255Octets Counter32, smonVxlanIdOutStatsPkts256to511Octets Counter32, smonVxlanIdOutStatsPkts512to1023Octets Counter32, smonVxlanIdOutStatsPkts1024to1518Octets Counter32, smonVxlanldOutStatsPktsHeaderErr Counter32 smonVxlanIdOutStatsCreateTime LastCreateTime }.

The tunnel ID to VNID mapping may be performed in global statistics structures which include a two dimensional table of tunnel ID versus VNID mapping.

In accordance with another exemplary embodiment, L2 Ingress Statistics counting based on an inner L2 Packet header, i.e., per VNID basis, which may be created after an overlay-encapsulated packet is de-encapsulated to retrieve one or more inner L2 packets therein, may include:

SmonVXLANIdInnerInStatsEntry ::=SEQUENCE {smonVxlanIdInnerInStatsId Integer32, smonVxlanIdInnerInStatsTotalPkts Counter32, smonVxlanIdInnerInStatsTotalOctets Counter32, smonVxlanIdInnerInStatsNUcastPkts Counter32, smonVxlanIdInnerInStatsNUcastOctets Counter32, smonVxlanIdInnerInStatsBroadcastPkts Counter32, smonVxlanIdInnerInStatsMulticastPkts Counter32, smonVxlanIdInnerInStatsCRCAlignErrors Counter32, smonVxlanIdInnerInStatsUndersizePkts Counter32, smonVxlanIdInnerInStatsOversizePkts Counter32, smonVxlanIdInnerInStatsFragments Counter32, smonVxlanIdInnerInStatsPkts64Octets Counter32, smonVxlanIdInnerInStatsPkts65to127Octets Counter32, smonVxlanIdInnerInStatsPkts128to255Octets Counter32, smonVxlanIdInnerInStatsPkts256to511Octets Counter32, smonVxlanIdInnerInStatsPkts512to1023Octets Counter32, smonVxlanIdInnerInStatsPkts1024to1518Octets Counter32, smonVxlanIdInnerInStatsPktsHeaderErr Counter32 smonVxlanIdInnerInStatsCreateTime LastCreateTime }.
The tunnel ID to VNID mapping may be performed in global statistics structures which include a two dimensional table of tunnel ID versus VNID mapping.

In accordance with another exemplary embodiment, L2 Egress Statistics counting based on an inner L2 Packet header, i.e. per VNID basis, which may be created before one or more inner L2 packets are encapsulated into an overlay-encapsulated packet, may include:
SmonVXLANIdInnerOutStatsEntry ::=SEQUENCE {smonVxlanIdInnerOutStatsId Integer32, smonVxlanIdInnerOutStatsTotalPkts Counter32, smonVxlanIdInnerOutStatsTotalOctets Counter32, smonVxlanIdInnerOutStatsNUcastPkts Counter32, smonVxlanIdInnerOutStatsNUcastOctets Counter32, smoriVxlanIdinnerOutStatqBroadcastPkts Counter32, smonVxlanIdInnerOutStatsMulticastPkts Counter32, smonVxlanIdInnerOutStatsCRCAlignErrors Counter32, smonVxlanIdInnerOutStatsUndersizePkts Counter32, smonVxlanIdInnerOutStatsOversizePkts Counter32, smonVxlanIdInnerOutStatsFragments Counter32, smonVxlanIdInnerOutStatsPkts64Octets Counter32, smonVxlanIdInnerOutStatsPkts65to127Octets Counter32, smonVxlanIdInnerOutStatsPkts128to255Octets Counter32, smonVxlanIdInnerOutStatsPkts256to511Octets Counter32, smonVxlanIdInnerOutStatsPkts512to1023Octets Counter32, smonVxlanIdInnerOutStatsPkts1024to1518Octets Counter32, smonVxlanIdInnerOutStatsPktsHeaderErr Counter32 smonVxlanIdInnerOutStatsCreateTime LastCreateTime }.
The tunnel ID to VNID mapping may be performed in global statistics structures which include a two dimensional table of tunnel ID versus VNID mapping.

Of course, other statistics not specifically described herein may be created and collected that may aid in understanding the overlay network usage, distribution, and performance, as would be understood by one of skill in the art upon reading the present descriptions.

In addition to packet statistics associated with packet ingress and egress through an overlay-capable device, error statistics based on inner and outer headers per virtual network ID (VNID) per Tunnel ID may also be created and collected. The details of the error statistics may be similar to, but not limited to, those described in the SMON MIB.

Some exemplary error statistics that may be created include, but are not limited to, a number of good packets received/sent, a number of bad packets received/sent, etc. Good packets may be determined based on some form of error checking determining that the packet is not corrupt.

Bad packets may be determined based on some form of error checking determining that the packet is corrupt. Error checking may include, but is not limited to, cyclic redundancy check (CRC), error-correcting code (ECC), header errors (such as an incorrect destination designation, an incorrect source designation, etc.), L2 errors, L3 errors, etc.

In one embodiment, a table may be maintained that is indexed for a VNID (such as a VXLAN ID) and a tunnel ID. Each entry in the table may comprise the VNID, the tunnel ID, and at least one predetermined property associated with the overlay-encapsulated packet and/or inner packet(s) of the overlay-encapsulated packet.

An exemplary table showing one possible format for a statistics storage table is shown below.

| VNID | TUNNEL ID | STATS 1 | STATS 2 | ... | STATS n |
|---|---|---|---|---|---|
| 0x000001 | 0x00001 | Bucket 1 | Bucket 2 | ... | Bucket n |
| 0x000004 | 0x00002 | Bucket n + 1 | Bucket n + 2 | ... | Bucket 2n |
| 0x000008 | 0x00004 | Bucket 2n + 1 | Bucket 2n + 2 | ... | Bucket 3n |
| ... | ... | ... | ... | ... | ... |
| VNID w | Tunnel 'w' | Bucket (w − 1)n + 1 | Bucket (w − 1)n + 2 | | Bucket wn |

In this table which is w rows by n columns (wxn) in size, there are particular column headers shown as examples. The statistics (STATS) may be any statistic that is designated to be collected (such as a particular property, count, type, time, size, etc., associated with a packet), and buckets are records of the statistics maintained in memory of the server or in the statistics blocks of an overlay gateway ASIC in the form similar to a SmonVXLANIdInnerOutStatsEntry structure, as described in previous sections according to one embodiment. The buckets may be simple pointers which point to actual statistics records stored somewhere in memory. The VNID is a virtual network identifier, which in some embodiments may be a 24 bit identifier, such as for a VXLAN ID, an overlay network ID, or any other conceivable identifier for the virtual network on which the statistics in a particular row are being kept.

The table may be indexed based on the VNID first, and then on a TUNNEL ID, which is a unique identifier assigned to each tunnel in a particular virtual network. Rows may be added or removed from the table, and any number of columns may exist, depending on how many statistics are being kept. Pointers to buckets may be added, removed, and/or changed. Buckets may be updated during packet processing after tunnel termination at ingress and at egress, at any time designated by a user, and/or upon occurrence of a trigger. Any trigger may be designated, such as establishment of a new tunnel, occurrence of a predetermined amount of time, etc.

According to another embodiment, statistics may be stored in a table indexed to TUNNEL ID, with the VNID being insignificant. For example, the table may appear as follows.

| VNID | TUNNEL ID | STATS 1 | STATS 2 | ... | STATS n |
|---|---|---|---|---|---|
| Null | 0x00001 | Bucket 1 | Bucket 2 | ... | Bucket n |
| Null | 0x00002 | Bucket n + 1 | Bucket n + 2 | ... | Bucket 2n |
| Null | 0x00004 | Bucket 2n + 1 | Bucket 2n + 2 | ... | Bucket 3n |
| ... | ... | ... | ... | ... | ... |
| null | Tunnel 'w' | Bucket (w − 1)n + 1 | Bucket (w − 1)n + 2 | | Bucket wn |

With this sort of table, statistics specific to a particular tunnel (which is identified by the TUNNEL ID) may be stored, such as packets ingress, packets egress, etc., for analysis or use by an administrator or to compare to accumulated statistics across all virtual networks which utilize the tunnel. In this way, leakage or other types of data loss may be determined and appropriate actions taken.

In another embodiment, the VNID column may not be present in this table, since it is not being utilized anyway.

According to one embodiment, statistics may be stored on a device which collects the statistics, or anywhere else that is accessible by a user wishing to utilize the statistics. For example, statistics may be stored in static random access memory (SRAM) in a network interface card (NIC), an overlay network gateway ASIC memory, or some other device. In another example, statistics may be stored in kernel memory, such as system RAM, of a server or some other device.

Figure 4A:
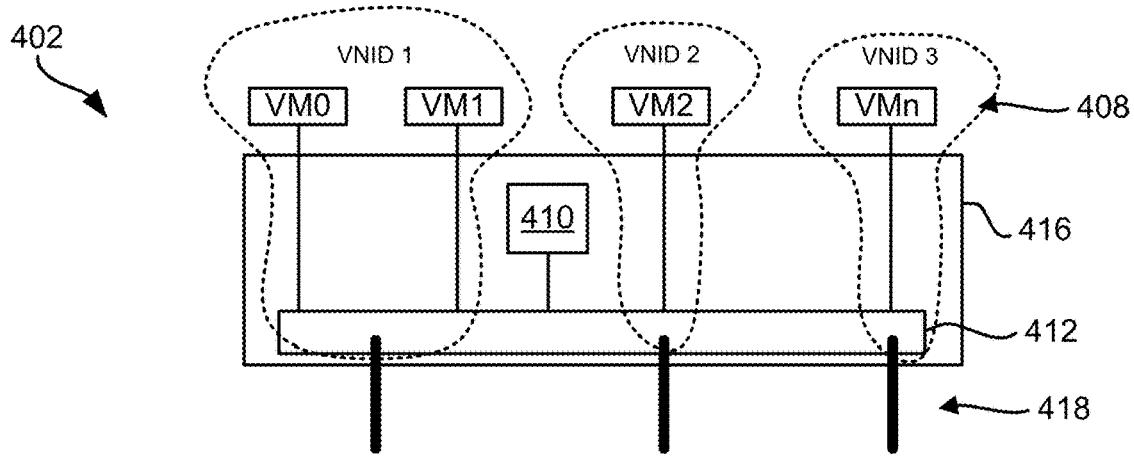
FIGS. 4A-4C show several embodiments of a system for providing statistics about overlay-encapsulated packets.
Figure 4B:
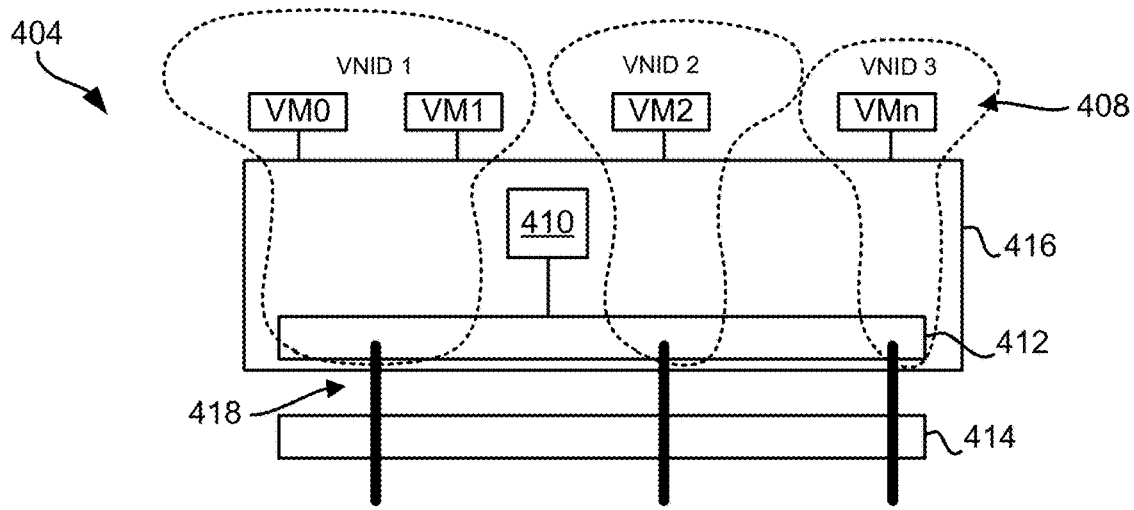
Figure 4C:
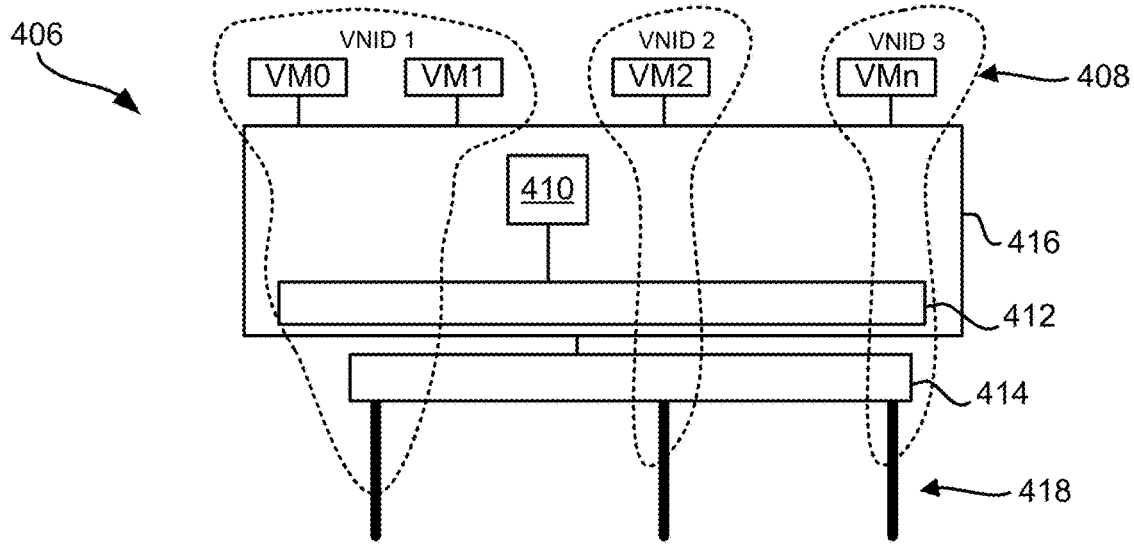

Now referring to FIGS. 4A-4C, a system may include any number and type of overlay-capable devices, according to several embodiments. The overlay-capable devices may be an overlay network gateway 402 as shown in FIG. 4A, an overlay-capable server 404 as shown in FIG. 4B, and/or an overlay-capable server 406 as shown in FIG. 4C. The overlay-capable devices may be connected to VMs 408, possibly in one or more virtual networks (indicated as VNID 1, VNID 2, VNID 3, etc.). The arrangement of the VMs 408 and the virtual networks is not meant to be limiting on what configurations are possible, as the Figures only show exemplary arrangements of VMs 408 and virtual networks.

Each overlay-capable device comprises an interface adapted for terminating and/or originating tunnels 418 with other overlay-capable devices, logic adapted for creating statistics about overlay-encapsulated packets which are received by or sent by the overlay-capable device, logic adapted for accumulating the statistics, and logic adapted for storing the statistics in an accessible memory 410 of the overlay-capable device.

Referring again to FIGS. 4A-4C, according to various embodiments, in the overlay network gateway 402 in FIG. 4A, the interface may be a switching processor 412; in overlay-capable server 404 in FIG. 4B, the interface may be a network interface card (NIC) 414; and in overlay-capable server 406 in FIG. 4C, the interface may be a hypervisor 416 running on the overlay-capable server 406. Any switching processor may be used, such as an application specific integrated circuit (ASIC), a field programmable gate array (FPGA), a central processing unit (CPU), or some other processor known in the art.

Referring again to FIGS. 4A-4C, in one embodiment, the statistics may be stored in a memory 410 of the overlay-capable device which created the statistics. The overlay-capable device may be any of an overlay network gateway 402, an overlay-capable server 404, 406 running a hypervisor 416, an overlay-capable NIC, etc.

In one approach, the logic adapted for creating the statistics may comprise logic adapted for counting occurrences of certain predetermined events, such as those described herein (packet ingress, packet egress, etc.) and others not specifically described but known to those of skill in the art.

In another approach, the logic adapted for creating the statistics may comprise logic adapted for counting events associated with de-encapsulation of one or more inner packets from an overlay-encapsulated packet and logic adapted for recording the statistics with a virtual network identifier and a tunnel identifier associated with the overlay-encapsulated packet.

In another approach, the logic adapted for creating the statistics may comprise logic adapted for counting events associated with encapsulation of one or more inner packets into an overlay-encapsulated packet and logic adapted for recording the statistics with a virtual network identifier and a tunnel identifier associated with the overlay-encapsulated packet.

Any of the logic described in relation to creating the statistics, packet switching, etc., may be in the switching processor 412 of the overlay network gateway 402, in the NIC 414 of the overlay-capable server 404 running a hypervisor 416, or in the hypervisor 416 of the overlay-capable server 406.

As shown in FIG. 4A, when the switching processor 412 of the overlay network gateway 402 is used to perform statistics creation and gathering, a relatively conventional method of implementing the logic for creating and storing the statistics may be used to cause the switching processor 412, which may be a switching ASIC, in some embodiments, to perform the additional statistics operations described herein, such as by providing a new switching ASIC which is designed to perform such operations or by reconfiguring a conventional ASIC to perform such operations.

As shown in FIG. 4C, when the hypervisor 416 of the overlay-capable server 406 is used to perform statistics creation and gathering, a relatively conventional method of implementing the logic for creating and storing the statistics may be used to cause the hypervisor 416, to perform the additional statistics operations described herein, such as by implementing new software code in the hypervisor to that effect.

However, as shown in FIG. 4B, when the NIC 414 of the overlay-capable server 404 running a hypervisor 416 is used to perform statistics creation and gathering, a new NIC will be implemented in order to perform the additional statistics operations, since conventional NICs do not have this functionality nor are they capable of terminating and originating tunnels in an overlay network, which is necessary in order to gain visibility to inner packets of the overlay-encapsulated packets to gather statistics thereabout. This new NIC 414 may be referred to as an accelerated NIC.

In this way, the overlay-capable device 402, 404, or 406 is capable of receiving, sending, encapsulating, and de-encapsulating packets and overlay-encapsulated packets, while gathering statistics about the packets, possibly at each step of encapsulating and de-encapsulating, sending, and receiving.

Referring again to FIGS. 4A-4C, in another approach, the overlay-capable device 402, 404, or 406 may further comprise logic adapted for maintaining a table indexed for the virtual network identifier and the tunnel identifier, the table comprising the virtual network identifier, the tunnel identifier, and statistic bucket identifiers pointing to locations where statistics associated with the virtual network identifier and the tunnel identifier are stored.

According to more approaches, the overlay-capable device 402, 404, or 406 may further comprise logic adapted for correlating statistics associated with an overlay-encapsulated packet with statistics associated with one or more inner packets thereof, and/or logic adapted for correlating statistics associated with each overlay network that utilizes a first tunnel with statistics associated with the first tunnel.

In effect, any logic capable of receiving and/or sending overlay-encapsulated packets may be used in the overlay-capable device 402, 404, or 406, such that statistics about inner packets of the overlay-encapsulated packets may be created when de-encapsulated from the overlay-encapsulated packets.

In an exemplary embodiment, an overlay network gateway 402 may comprise a switching processor having logic adapted for terminating and/or originating tunnels in an overlay network; logic adapted for creating statistics about overlay-encapsulated packets which are received by or sent by the overlay-capable device; logic adapted for accumulating the statistics; logic adapted for recording the statistics with a virtual network identifier and a tunnel identifier associated with the overlay-encapsulated packets; and logic adapted for storing the statistics in a memory or a set of registers of the overlay network gateway. The logic adapted for creating the statistics may comprise logic adapted for counting events associated with de-encapsulation of inner packets from overlay-encapsulated packets and logic adapted for counting events associated with encapsulation of inner packets into overlay-encapsulated packets.

In another exemplary embodiment, an overlay-capable server 406 may comprise logic adapted for terminating and/or originating tunnels in an overlay network; logic adapted for creating statistics about overlay-encapsulated packets which are received by or sent by the overlay-capable server; logic adapted for accumulating the statistics; logic adapted for recording the statistics with a virtual network identifier and a tunnel identifier associated with the overlay-encapsulated packets; and logic adapted for storing the statistics in a memory or a set of registers of the overlay-capable server. The logic adapted for creating the statistics may comprise logic adapted for counting events associated with de-encapsulation of inner packets from overlay-encapsulated packets and logic adapted for counting events associated with encapsulation of inner packets into overlay-encapsulated packets.

In a further embodiment, either a NIC 414 or a hypervisor 416 running on the overlay-capable server 406 may comprise all of the logic. The NIC 414 may store the statistics in a memory or a set of registers of the NIC 414, and/or the hypervisor 416 may store the statistics in a kernel memory.

Figure 5:
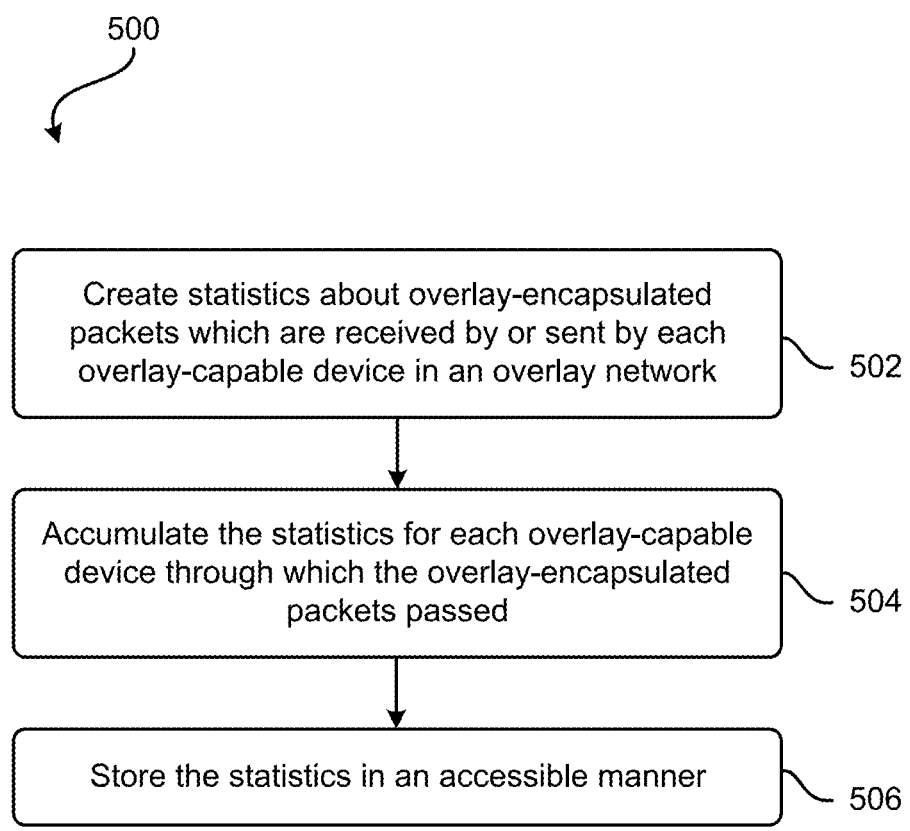
FIG. 5 is a flowchart of a method, according to one embodiment.

Now referring to FIG. 5, a method 500 is shown according to one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by an overlay-capable device such as a switch, a processor (such as a CPU, an ASIC, a FPGA, etc.), a hypervisor, an overlay network gateway, an overlay switch capable of originating or terminating a tunnel, computer program code embedded in a computer readable storage medium, etc., in various approaches.

As shown in FIG. 5, method 500 may initiate with operation 502, where statistics are created about overlay-encapsulated packets which are received by or sent by each overlay-capable device in an overlay network. Any overlay-capable device may be used, as described herein. The overlay-encapsulated packets may include an overlay header and may be encapsulated according to VXLAN standards or some other overlay network standard.

In one approach, creating the statistics may comprise counting events associated with de-encapsulation of one or more inner packets from an overlay-encapsulated packet and recording the statistics with a virtual network identifier and a tunnel identifier associated with the overlay-encapsulated packet.

In another approach, creating the statistics may comprise counting events associated with encapsulation of one or more inner packets into an overlay-encapsulated packet and recording the statistics with a virtual network identifier and a tunnel identifier associated with the overlay-encapsulated packet. Events may include sending, receiving, dropping, re-routing, or any other event that may be associated with switching, routing, and/or managing packets at a switching device.

In this way, the statistics may comprise information associated with encapsulation and de-encapsulation of inner packets into and out of an overlay-encapsulated packet, such that details, characteristics, sizes, number, and any other desired properties of the inner packets may be recorded as a statistic associated with the overlay-encapsulated packet and the tunnel and virtual network thereof.

The method 500 may also comprise receiving a packet at an overlay-capable device, determining a destination address for the packet, encapsulating the packet with an overlay header after creating the statistics, and sending the overlay-encapsulated packet to the destination address, according to one approach.

In another approach, the method 500 may also comprise receiving an overlay-encapsulated packet at an overlay-capable device, de-encapsulating one or more inner packets from the overlay-encapsulated packet, determining a destination address for the one or more inner packets, and (after creating the statistics): 1) re-encapsulating the one or more inner packets with an overlay header to be switched to the destination address and sending the overlay-encapsulated packet to the destination address; or 2) sending the one or more inner packets to the destination address.

Of course, any operations capable of encapsulating and de-encapsulating overlay-encapsulated packets may be used in conjunction with method 500 for retrieving inner packets to obtain statistics about the inner packets, as would be understood by one of skill in the art upon reading the present descriptions.

In operation 504, the statistics for each overlay-capable device through which the overlay-encapsulated packets passed are accumulated. In one embodiment, the statistics are accumulated based on a VNID (such as a VXLAN ID) per tunnel (recorded based on the tunnel ID).

In operation 506, the statistics are stored in an accessible manner. For example, the statistics may be stored on a device which created the statistics, in a set of registers, in a central repository, in SRAM, in kernel memory, or in some other way known in the art.

In one embodiment, the statistics may be stored in a memory of an overlay-capable device which created the statistics. Furthermore, the overlay-capable device may be an overlay network gateway, an overlay-capable server running a hypervisor, an overlay-capable NIC, etc.

Storing the statistics may also include creating a particular storage construct, such as a table, to store the statistics in such that there is context to what the statistics represent. In one such embodiment, the method 500 may further comprise maintaining a table indexed for the virtual network identifier and the tunnel identifier, the table comprising at least the virtual network identifier, the tunnel identifier, and statistic bucket identifiers pointing to locations where statistics associated with the virtual network identifier and the tunnel identifier are stored.

In another embodiment, the method 500 may further comprise correlating statistics associated with an overlay-encapsulated packet with statistics associated with one or more inner packets thereof. In this way, an administrator has the ability to understand statistics about each tunnel and all traffic which is flowing through each tunnel, for diagnostic and/or analysis purposes.

In yet another embodiment, the method 500 may further comprise correlating statistics associated with each overlay network that utilizes a first tunnel with statistics associated with the first tunnel. In this way, an administrator has the ability to understand statistics about each tunnel and each overlay network which utilizes the tunnel, for diagnostic and/or analysis purposes.

In still another embodiment, the method 500 may comprise metering traffic flow on an overlay network based on statistics associated with the overlay network and/or metering traffic flow across a tunnel based on statistics associated with the tunnel. Any type of metering may be used, such as backpressure, dropping low-priority packets, re-directing traffic, or any other form of metering known in the art. The statistics may indicate problems or inefficiencies in the network which may be addressed by metering traffic around a particular device, tunnel, etc.

According to another embodiment, the method 500 may be executed from a computer program product using a processor capable of executing such computer readable program code. For example, a computer program product for generating statistics about encapsulated packets within a virtual overlay network may include a computer readable storage medium having computer readable program code embodied therewith. The computer readable program code may comprise some or all of: computer readable program code configured for creating statistics about overlay-encapsulated packets which are received by or sent by each overlay-capable device in an overlay network; computer readable program code configured for accumulating the statistics for each overlay-capable device through which the overlay-encapsulated packets passed; and computer readable program code configured for storing the statistics in an accessible manner.

The statistics may be stored in a memory of an overlay-capable device which created the statistics, which may be an overlay network gateway, an overlay-capable server running a hypervisor, an overlay-capable NIC, etc.

In another embodiment, the computer program product may include some or all of: computer readable program code configured for counting events associated with de-encapsulation of one or more inner packets from an overlay-encapsulated packet, computer readable program code configured for recording the statistics with a virtual network identifier and a tunnel identifier associated with the overlay-encapsulated packet, and computer readable program code configured for maintaining a table indexed for the virtual network identifier and the tunnel identifier, the table comprising the virtual network identifier, the tunnel identifier, and statistic bucket identifiers pointing to locations where statistics associated with the virtual network identifier and the tunnel identifier are stored.

According to another approach, the computer program product may include some or all of: computer readable program code configured for metering traffic flow on an overlay network based on statistics associated with the overlay network, and computer readable program code configured for metering traffic flow across a tunnel based on statistics associated with the tunnel.

Furthermore, in some approaches, the computer program product may include some or all of: computer readable program code configured for counting events associated with encapsulation of one or more inner packets into an overlay-encapsulated packet, and computer readable program code configured for recording the statistics with a virtual network identifier and a tunnel identifier associated with the overlay-encapsulated packet.

According to more approaches, the computer program product may include computer readable program code configured for, at least one of: correlating statistics associated with an overlay-encapsulated packet with statistics associated with one or more inner packets thereof, and correlating statistics associated with each overlay network that utilize a first tunnel with statistics associated with the first tunnel.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a hardware processor and logic integrated with the hardware processor, executable by the hardware processor, or integrated with and executable by the hardware processor, the logic being configured to:
create, on a per-tunnel basis, statistics about overlay-encapsulated packets which are received by or sent by the hardware processor across an overlay network, including counting events associated with de-encapsulation of one or more inner packets from an overlay-encapsulated packet;
record the statistics in association with a virtual network identifier and a tunnel identifier that identifies a tunnel on which the overlay-encapsulated packets are received or sent; and
maintain a table indexed for the virtual network identifier and the tunnel identifier, the table comprising:
the virtual network identifier;
the tunnel identifier; and
statistic bucket identifiers pointing to locations where statistics associated with the virtual network identifier and the tunnel identifier are stored.

2. The system as recited in claim 1, wherein the logic configured to create, on the per-tunnel basis, the statistics includes logic configured to count events associated with an encapsulation of one or more of the inner packets into the overlay-encapsulated packet, the events including:
sending one or more packets,
receiving one or more packets,
dropping one or more packets, and
re-routing one or more packets.

3. The system as recited in claim 1, wherein the statistics include Layer-2 (L2) egress statistics, L2 ingress statistics, or L2 egress statistics and L2 ingress statistics based on outermost local area network (LAN) headers of the overlay-encapsulated packets.

4. The system as recited in claim 1, wherein the statistics include Layer-2 (L2) egress statistics or L2 ingress statistics based on outermost local area network (LAN) headers of the overlay-encapsulated packets.

5. The system as recited in claim 1, wherein the statistics include egress statistics, ingress statistics, or egress and ingress statistics based on outermost local area network (LAN) headers of the overlay-encapsulated packets.

6. The system as recited in claim 1, wherein the logic is further configured to:
meter traffic flow on an overlay network based on statistics associated with the overlay network.

7. The system as recited in claim 1, wherein the logic is further configured to:
meter traffic flow across a tunnel associated with the tunnel identifier based on statistics associated with the tunnel.

8. The system as recited in claim 1, wherein the logic is further configured to:
count events associated with encapsulation of one or more inner packets into an overlay-encapsulated packet.

9. The system as recited in claim 1, wherein the logic is further configured to:
correlate statistics associated with an overlay-encapsulated packet with statistics associated with one or more inner packets of the overlay-encapsulated packet.

10. The system as recited in claim 1, wherein the logic is further configured to:
correlate statistics associated with each overlay network that utilizes a first tunnel with statistics associated with the first tunnel.

11. A method, comprising:
creating on a per-tunnel basis, by a hardware processor, statistics about overlay- encapsulated packets which are received by or sent by the hardware processor across an overlay network, including counting events associated with de-encapsulation of one or more inner packets from an overlay-encapsulated packet;
recording, by the hardware processor, the statistics in association with a virtual network identifier and a tunnel identifier that identifies a tunnel on which the overlay- encapsulated packets are received or sent; and
maintaining, by the hardware processor, a table indexed for the virtual network identifier and the tunnel identifier, the table comprising:
the virtual network identifier;
the tunnel identifier; and
statistic bucket identifiers pointing to locations where statistics associated with the virtual network identifier and the tunnel identifier are stored.

12. The method as recited in claim 11, further comprising storing the statistics in a storage device accessible to the hardware processor, wherein the statistics include Layer-2 (L2) egress statistics and L2 ingress statistics based on outermost local area network (LAN) headers of the overlay-encapsulated packets.

13. The method as recited in claim 11, further comprising:
metering traffic flow on the overlay network based on statistics associated with the overlay network.

14. The method as recited in claim 11, further comprising:
metering traffic flow across a tunnel associated with the tunnel identifier based on statistics associated with the tunnel.

15. The method as recited in claim 11, further comprising:
counting events associated with encapsulation of one or more inner packets into an overlay-encapsulated packet.

16. The method as recited in claim 11, further comprising:
correlating statistics associated with an overlay-encapsulated packet with statistics associated with one or more inner packets of the overlay-encapsulated packet.

17. The method as recited in claim 11, further comprising:
correlating statistics associated with each overlay network that utilizes a first tunnel with statistics associated with the first tunnel.

18. A computer program product comprising a computer readable hardware storage device having computer readable program code embodied therewith, the embodied computer readable program code comprising:
computer readable program code to create, on a per-tunnel basis, statistics about overlay-encapsulated packets which are received by or sent by a processor across an overlay network, including counting events associated with de-encapsulation of one or more inner packets from an overlay-encapsulated packet;
computer readable program code to record the statistics in association with a virtual network identifier and a tunnel identifier that identifies a tunnel on which the overlay-encapsulated packets are received or sent; and
computer readable program code to maintain a table indexed for the virtual network identifier and the tunnel identifier, the table comprising:
the virtual network identifier;
the tunnel identifier; and
statistic bucket identifiers pointing to locations where statistics associated with the virtual network identifier and the tunnel identifier are stored.

19. The computer program product as recited in claim 18, the embodied computer readable program code further comprising:
computer readable program code to meter traffic flow on the overlay network based on statistics associated with the overlay network.

20. The computer program product as recited in claim 18, the embodied computer readable program code further comprising:
computer readable program code to meter traffic flow across a tunnel associated with the tunnel identifier based on statistics associated with the tunnel; and
computer readable program code to count events associated with encapsulation of one or more inner packets into an overlay-encapsulated packet.

* * * * *